(12) United States Patent
Giannelis et al.

(10) Patent No.: US 10,773,236 B2
(45) Date of Patent: Sep. 15, 2020

(54) METAL OXIDE FOAM, AMINE FUNCTIONAL SOLID SORBENT, METHODS AND APPLICATIONS

(75) Inventors: Emmanuel P. Giannelis, Ithaca, NY (US); Liling Fu, Ithaca, NY (US); Genggeng Qi, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 440 days.

(21) Appl. No.: 13/980,103

(22) PCT Filed: Jan. 18, 2012

(86) PCT No.: PCT/US2012/021627
§ 371 (c)(1),
(2), (4) Date: Sep. 6, 2013

(87) PCT Pub. No.: WO2012/099913
PCT Pub. Date: Jul. 26, 2012

(65) Prior Publication Data
US 2013/0338001 A1     Dec. 19, 2013

Related U.S. Application Data

(60) Provisional application No. 61/433,590, filed on Jan. 18, 2011, provisional application No. 61/434,079, filed on Jan. 19, 2011, provisional application No. 61/548,751, filed on Oct. 19, 2011.

(51) Int. Cl.
| | | |
|---|---|---|
| *B01J 20/26* | (2006.01) | |
| *C01G 27/02* | (2006.01) | |
| (Continued) | | |

(52) U.S. Cl.
CPC ............ *B01J 20/261* (2013.01); *B01J 20/06* (2013.01); *B01J 20/103* (2013.01); *B01J 20/22* (2013.01);
(Continued)

(58) Field of Classification Search
CPC ........ B01J 20/261; B01J 20/06; B01J 20/103; B01J 20/22; B01J 20/28004;
(Continued)

(56) References Cited

U.S. PATENT DOCUMENTS

| 4,668,255 A | 5/1987 | Govind |
|---|---|---|
| 4,810,266 A | 3/1989 | Zinnen et al. |
| (Continued) | | |

FOREIGN PATENT DOCUMENTS

| WO | 2007129849 A1 | 11/2007 |
|---|---|---|
| WO | 2008021700 | 2/2008 |
| (Continued) | | |

OTHER PUBLICATIONS

Genggeng Qi et al., High Efficiency Nanocomposite Sorbents for CO2 Capture Based on Amine-Functionalized Mesoporous Capsules, www.rscorog/ees, Energy & Environmental Science, 2011, 4,444-452.
(Continued)

*Primary Examiner* — James A Fiorito
(74) *Attorney, Agent, or Firm* — Bond, Schoeneck & King, PLLC; Blaine Bettinger

(57) ABSTRACT

Amine functional solid sorbents for carbon dioxide capture and sequestration may be prepared from metal oxide foam solid sorbent supports by treating an appropriate metal oxide foam solid sorbent support with an amine material. Desirable are metal oxide foam solid sorbent supports with a foam structure and morphology at least substantially absent hollow sphere, layered sphere, wormlike and amorphous structure and morphology components. The amine materials may be sorbed into the metal oxide foam solid sorbent support, or alternatively chemically bonded, such as but not limited to covalently bonded, to the metal oxide foam solid sorbent support.

33 Claims, 17 Drawing Sheets

(51) Int. Cl.
| | |
|---|---|
| C01G 25/02 | (2006.01) |
| C01G 23/047 | (2006.01) |
| C01B 37/02 | (2006.01) |
| B01J 20/28 | (2006.01) |
| B01J 20/32 | (2006.01) |
| B01J 20/30 | (2006.01) |
| B01J 20/06 | (2006.01) |
| B01J 20/10 | (2006.01) |
| B01J 20/22 | (2006.01) |

(52) U.S. Cl.
CPC ... *B01J 20/28004* (2013.01); *B01J 20/28045* (2013.01); *B01J 20/28083* (2013.01); *B01J 20/305* (2013.01); *B01J 20/3085* (2013.01); *B01J 20/3204* (2013.01); *B01J 20/3246* (2013.01); *B01J 20/3248* (2013.01); *B01J 20/3257* (2013.01); *B01J 20/3259* (2013.01); *B01J 20/3272* (2013.01); *C01B 37/02* (2013.01); *C01G 23/047* (2013.01); *C01G 25/02* (2013.01); *C01G 27/02* (2013.01); *Y02C 20/40* (2020.08)

(58) Field of Classification Search
CPC ............ B01J 20/28045; B01J 20/28083; B01J 20/305; B01J 20/3085; B01J 20/3204; B01J 20/3246; B01J 20/3248; B01J 20/3257; B01J 20/3259; B01J 20/3272; B01B 37/02; C01G 23/047; C01G 25/02; C01G 27/02
USPC ................ 502/400, 401, 407, 439
See application file for complete search history.

(56) References Cited

U.S. PATENT DOCUMENTS

| | | | |
|---|---|---|---|
| 5,876,488 | A | 3/1999 | Birbara et al. |
| 6,364,938 | B1 | 4/2002 | Birbara et al. |
| 6,547,854 | B1 | 4/2003 | Gray et al. |
| 6,755,892 | B2 | 6/2004 | Nalette et al. |
| 6,908,497 | B1 | 6/2005 | Sirwardane |
| 6,911,189 | B1 | 6/2005 | Koller et al. |
| 7,288,136 | B1 | 10/2007 | Gray et al. |
| 7,452,406 | B2 | 11/2008 | Little et al. |
| 7,527,677 | B2 | 5/2009 | Saito et al. |
| 7,767,004 | B2 | 8/2010 | Sayari et al. |
| 7,795,175 | B2 | 9/2010 | Olah et al. |
| 7,842,126 | B1 | 11/2010 | Dilmore et al. |
| 8,030,509 | B2 | 10/2011 | Perry et al. |
| 8,043,418 | B2 | 10/2011 | Ruud et al. |
| 2006/0165574 | A1 | 7/2006 | Sayari |
| 2007/0022877 | A1 | 2/2007 | Marand et al. |
| 2007/0149398 | A1* | 6/2007 | Jones et al. ............... 502/402 |
| 2008/0293976 | A1* | 11/2008 | Olah et al. ............... 568/698 |
| 2010/0043636 | A1 | 2/2010 | Hwang et al. |
| 2011/0088549 | A1 | 4/2011 | Sayari et al. |
| 2011/0179948 | A1 | 7/2011 | Choi et al. |

FOREIGN PATENT DOCUMENTS

| | | |
|---|---|---|
| WO | 2008021700 A1 | 2/2008 |
| WO | 2010091831 | 8/2010 |
| WO | 2010091831 A1 | 8/2010 |

OTHER PUBLICATIONS

Kim et al., CO2 adsorption using amine-functionalized mesoporous silica prepared via anionic surfactant-mediated synthesis, Microporous and Mesoporous Materials 115 (2008), 497-503.
Ma et al., "Molecular Basket" Sorbents for Separation of CO2 and H2S from Various Gas Streams, J. Am. Chem. Soc., 2009, 131 (16), 5777-5783.
Chang et al., In-Situ Infrared Study of CO2 Adsorption on SBA-15 Grafted with y-(Aminopropyl)triethoxysilane, Energy & Fuels 2003, 17, 468-473.
Harlick et al., Applications of Pore-Expanded Mesoporous Silica. 5. Triamine Grafted Material with Exceptional CO2 Dynamic and Equilibrium Adsorption Performance, Ind. Eng. Chem. Res., 2007, 46 (2), 446-458.
Franchi, et al., Applications of Pore-Expanded Mesoporous Silica. 2. Development of a High-Capacity, Water-Tolerant Adsorbent for CO2, Ind. Eng. Chem. Res., 2005, 44 (21), 8007-8013.
Huang et al., Amine-Grafted MCM-48 and Silica Xerogel as Superior Sorbents for Acidic Gas Removal from Natural Gas, Ind. Eng. Chem. Res., 2003, 42 (12), 2427-2433.
Hicks et al., Designing Adsorbents for CO2 Capture from Flue Gas-Hyperbranched Aminosilicas Capable of Capturing CO2 Reversibly, J. Am. Chem. Soc., 2008, 130 (10), pp. 2902-2903.
Zheng et al., Ethylenediamine-Modified SBA-15 as Regenerable CO2 Sorbent, Ind. Eng. Chem. Res., 2005, 44 (9), 3099-3105.
Chew et al., Ordered mesoporous silica (OMS) as an adsorbent and membrane for separation of carbon dioxide (CO2), Advances in Colloid and Interface Science 153 (2010) 43-57.
Aziz et al., Carbon Dioxide Sorbents with Propylamine Groups—Silica Functionalized with a Fractional Design Approach, Langmuir, Apr. 5, 2011; 27(7): 3822-34. Epub Mar. 1, 2011.
Bhagiyalakshmi et al., Utilization of rice husk ash as silica source for the synthesis of mesoporous silicas and their application to CO2 adsorption through TREN/TEPA grafting, Journal of Hazardous Materials, 175 (2010), 928-938.
Bacsik et al., Mechanisms and Kinetics for Sorption of CO2 on Bicontinuous Mesoporous Silica Modified with n-Propylamine, Langmuir, 2011, 27, 11118-11128.
Kim et al., Tailoring pore properties of MCM-48 silica for selective adsorption of CO2, J Phys Chem B. Apr. 7, 2005; 109 (13):6287-93.
Serna-Guerrero et al., New Insights into the Interactions of CO2 with Amine-Functionalized Silica, Ind. Eng. Chem. Res., 2008, 47 (23), pp. 9406-9412.
Su et al., Capture of CO2 from flue gas via multiwalled carbon nanotubes, Science of the Total Environment 407 (2009) 3017-3023.
Xu et al., Novel Polyethylenimine-Modified Mesoporous Molecular Sieve of MCM-41 Type as High-Capacity Adsorbent for CO2 Capture, Energy Fuels, 2002, 16 (6), pp. 1463-1469.
Ma et al., "Molecular Basket" Sorbents for Separation of CO2 and H2S from Various Gas Streams, J. Am. Chem. Soc., 2009,131 (16), pp. 5777-5783.
Chang et al., In-Situ Infrared Study of CO2 Adsorption on SBA-15 Grafted with ç-(Aminopropyl)triethoxysilane, Energy & Fuels 2003, 17, 468-473.
Harlick et al., Applications of Pore-Expanded Mesoporous Silica. 5. Triamine Grafted Material with Exceptional CO2 Dynamic and Equilibrium Adsorption Performance, Ind. Eng. Chem. Res., 2007, 46 (2), pp. 446-458.
Franchi et al., Applications of Pore-Expanded Mesoporous Silica. 2. Development of a High-Capacity, Water-Tolerant Adsorbent for CO2, Ind. Eng. Chem. Res., 2005, 44 (21), pp. 8007-8013.
Huang et al, Amine-Grafted MCM-48 and Silica Xerogel as Superior Sorbents for Acidic Gas Removal from Natural Gas, Ind. Eng. Chem. Res., 2003, 42 (12), pp. 2427-2433.
Zheng et al., Ethylenediamine-Modified SBA-15 as Regenerable CO2 Sorbent, Ind. Eng. Chem. Res., 2005, 44 (9), pp. 3099-3105.
Aziz et al., Carbon dioxide sorbents with propylamine groups-silica functionalized with a fractional design approach, Langmuir. Apr. 5, 2011;27(7):3822-34. Epub Mar. 1, 2011.
Xiaochun Xu et al., Adsorption separation of carbon dioxide from flue gas of natural gas-fired boiler by a novel nanoporous "molecular basket" adsorbent, Fuel Processing Technology 86 (2005) 1457-1472.
Xiaochun Xu et al., Novel Polyethylenimine-Modified Mesoporous Molecular Sieve of MCM-41 Type as High-Capacity Adsorbent for CO2 Capture, Energy & Fuels 2002, 16, 1463-1469.

(56) References Cited

OTHER PUBLICATIONS

Sergio Meth, et al., Silica Nanoparticles as Supports for Regenerable CO2 Sorbents, Energy & Fuels 2012, 26, pp. 3082-3090.

Miklos Czaun, et al., Organoamines-grafted on nano-sized silica for carbon dioxide capture, Journal of CO2 Utilization 1 (2013) 1-7.

Alain Goeppert, et al. Nanostructured silica as a support for regenerable high-capacity organoamine-based CO2 sorbents, The Royal Society of Chemistry 2010, Energy Environ. Sci., 2010, 3, 1949-1960.

Alain Goeppert, et al., Carbon Dioxide Capture from the Air Using a Polyamine Based Regenerable Solid Adsorbent, pp. 1 and 2.

Alain Goeppert, et al., Carbon Dioxide Capture from the Air Using a Polyamine Based Regenerable Solid Adsorbent, J. Am. Chem. Soc. 2011, 133, 20164-20167.

Dongyuan Zhao et al., Triblock Copolymer Syntheses of Mesoporous Silica with Periodic 50 to 300 Angstrom Pores, Science, vol. 279, Jan. 23, 1998, www.sciencemag.org, pp. 548-552.

Jeffrey H. Drese et al., Synthesis-Structure-Property Relationships for Hyperbranched Aminosilica CO2 Adsorbents, Adv. Funct. Mater. 2009, 19, 1-12.

Jeffrey H. Drese et al., Synthesis-Structure-Property Relationships for Hyperbranched Aminosilica CO2 Adsorbents, Advanced Functional Materials, 2009, 19, pp. 1-8.

Jason C. Hicks et al., Designing Adsorbents for CO2 Capture From Flue Gas—Hyperbranched Aminosilicas Capable of Capturing CO2 Reversibly, J. Am. Chem. Soc. 2008, 130, pp. 2902, 2903.

Jason C. Hicks et al., Supporting Information—Designing Adsorbents for CO2 Capture from Flue Gas-Hyperbranched Aminosilicas Capable of Capturing CO2 Reversibly, J. Am. Chem. Soc. 2008, pp. S1 and S2.

SBA-15 (20g)—SBA-15—ACS Material-Advanced Chemicals Supplier, http://www.acsmaterial.com/product.asp?cid=29&id=23, Dec. 11, 2014, pp. 1-4.

MCM-41—MCM-41—ACS Material-Advanced Chemicals Supplier, http://www.acsmaterial.com/product.asp?cid=30&id=24, pp. 1-5, Dec. 11, 2014.

* cited by examiner

| Sample | Surface Area ($m^2 g^{-1}$) | Pore Size (nm) | Pore Volume ($cm^3 g^{-1}$) | Structure | $CO_2$ capacity ($mmol\, g^{-1}$) |
|---|---|---|---|---|---|
| $NH_4F$-a | 827.7 | 8.1 | 1.58 | Foam/worm | 4.49 |
| $NH_4F$-b | 650.3 | 14.8 | 2.35 | Foam | 5.19 |
| $NH_4F$-c | 367.0 | 24.6 | 2.22 | Foam | 5.36 |
| $NH_4F$-d | 344.6 | 18.0 | 1.53 | Mixed | 1.80 |

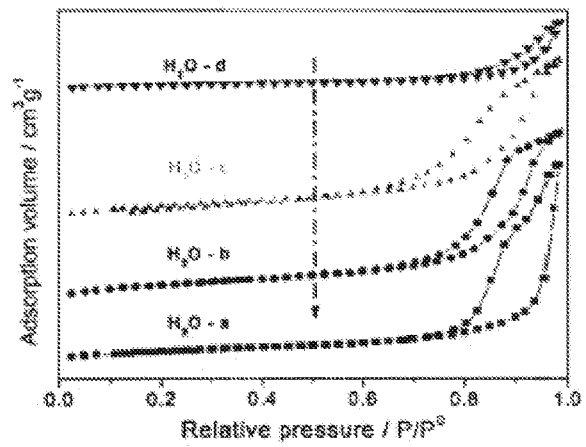
FIG. 9E
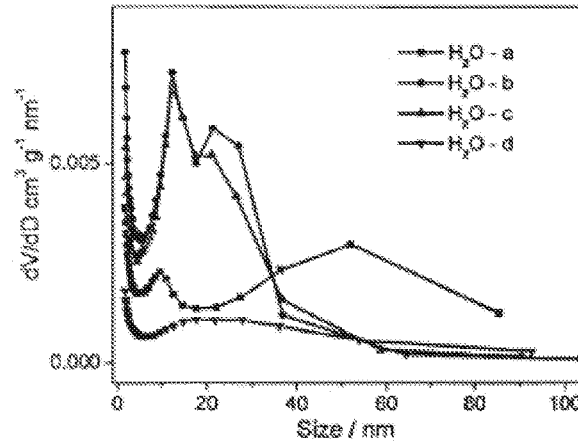
FIG. 9F
| Sample | Surface Area (m²g⁻¹) | Pore Size (nm) | Pore Volume (cm³g⁻¹) | Structure | CO₂ capacity (mmol g⁻¹) |
|---|---|---|---|---|---|
| H₂O-a | 367.0 | 24.6 | 2.22 | Foam | 5.36 |
| H₂O-b | 659.5 | 12.1 | 1.95 | Onion | 3.29 |
| H₂O-c | 571.6 | 13.3 | 1.85 | Foam/onion | 4.71 |
| H₂O-d | 159.2 | 19.9 | 0.78 | Mixed | 2.59 |
FIG. 9G

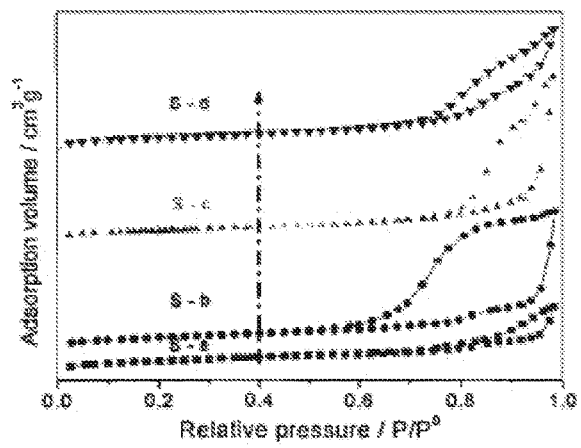
FIG. 10E
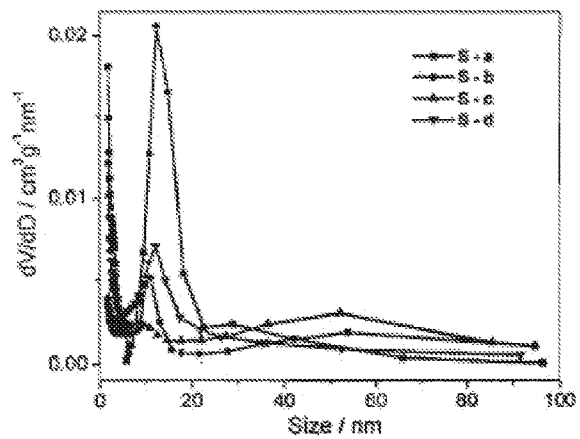
FIG. 10F
| Sample | Surface Area (m²g⁻¹) | Pore Size (nm) | Pore Volume (cm³g⁻¹) | Structure | $CO_2$ capacity (mmol g⁻¹) |
|---|---|---|---|---|---|
| S-a | 563.6 | 6.9 | 0.95 | Wormlike | 3.36 |
| S-b | 585.7 | 13.4 | 1.92 | Onion/HS | 3.17 |
| S-c | 367.0 | 24.6 | 2.22 | Foam | 5.36 |
| S-d | 427.8 | 15.9 | 1.67 | Onion | 2.41 |
FIG. 10G

| Sample | Structure | $CO_2$ capacity (mmol g$^{-1}$) |
|---|---|---|
| T-a | Amorphous | 0.49 |
| T-b | Foam | 5.36 |
| T-c | HS/wormlike | 4.36 |
| T-d | Foam | 5.45 |
| T-e | Foam | 5.22 |
| T-f | Mixed | 3.68 |

METAL OXIDE FOAM, AMINE FUNCTIONAL SOLID SORBENT, METHODS AND APPLICATIONS

CROSS-REFERENCE TO RELATED APPLICATIONS

This application is related to, and derives priority from: (1) U.S. Provisional Patent Application Ser. No. 61/433,590, filed 18 Jan. 2011, and titled "Nanostructured Apparatus, Methods and Applications Pertaining to $CO_2$ Capture;" (2) U.S. Provisional Patent Application Ser. No. 61/434,079, filed 19 Jan. 2011, and titled "Nanostructured Apparatus, Methods and Applications Pertaining to $CO_2$ Capture;" and (3) U.S. Provisional Patent Application Ser. No. 61/548,751, filed 19 Oct. 2011, and titled Tethered Amine Functional Metal Oxide Foams, Methods and Applications, the disclosures of each of which are incorporated herein fully by reference.

BACKGROUND

Field of the Invention

Embodiments relate generally to solid sorbents for $CO_2$ capture and sequestration. More particularly, embodiments relate to amine functional solid sorbents for $CO_2$ capture and sequestration.

Description of the Related Art

Rising levels of atmospheric $CO_2$ from the consumption of fossil fuels have been widely implicated as a main contributor to global climate change. To mitigate the surging $CO_2$ emissions, post-combustion capture from existing power plant emissions provides a feasible near-term solution. The current state-of-the-art industrial process for post-combustion capture—amine scrubbing—is based on $CO_2$ absorption using aqueous amine solutions or chilled ammonia, which suffers from relatively low energy efficiency and issues associated with the use of liquid amine solvents such as equipment corrosion, solvent loss, and toxicity. To overcome such challenges, adsorption via solid-supported amines has been proposed as an attractive alternative for low temperature post-combustion capture. Based on the reversible amine-$CO_2$ chemistry, solid-supported amines are highly selective towards $CO_2$ and more robust in terms of capacity against moisture compared to adsorbents based mainly on physisorption, such as zeolites, activated carbons and many metal-organic frameworks. Meanwhile, the energy penalty required for sorbent regeneration and corrosiveness can potentially be reduced as amines are anchored to solid supports.

In light of the foregoing advantages of amine functional solid sorbents for $CO_2$ capture and sequestration, desirable are additional high capacity amine functional solid sorbents that may be readily and efficiently prepared.

SUMMARY

Embodiments include: (1) a metal oxide foam solid sorbent support (i.e., and in particular a silica foam solid sorbent support) for preparing an amine functional solid sorbent for $CO_2$ capture and sequestration; (2) a method for preparing a such a silica foam solid sorbent support; (3) the amine functional solid sorbent prepared from the metal oxide foam solid sorbent support; and (4) a method for preparing the amine functional solid sorbent for $CO_2$ capture and sequestration from the metal oxide foam solid sorbent support. Embodiments also include an additional particular method for preparing an amine functional solid sorbent with covalent linkage between an amine material and a metal oxide solid sorbent support that need not necessarily be a foam.

A metal oxide foam solid sorbent support in accordance with the embodiments comprises a metal oxide material that has a particular structure and morphology within the context of a transmission electron microscopy analysis. Such a metal oxide foam solid sorbent support has a foam like or moss like structure and morphology substantially absent inclusion of hollow sphere components, onion like layered sphere components, wormlike components and amorphous metal oxide material components (i.e., where the "amorphous metal oxide material components," which may alternatively be referred to as "amorphous inclusions," are inherently intended as amorphous metal oxide material inclusions that are neither foam like nor moss like). The metal oxide foam solid sorbent support in accordance with the embodiments also shows no particular X-ray diffraction spectral features (i.e., generally intended as no peaks) at low angles between about 4 and about 10 degrees (or up to at least about 10 degrees, as illustrated in FIG. 3, and discussed further below). The unit cells of the metal oxide foam solid sorbent support have a diameter ranging typically from about 20 to about 200 nm and window opening from about 10 to about 40 nm. In accordance with further discussion below related to FIG. 2, the metal oxide foam solid sorbent support in accordance with the embodiments also has: (1) a particular bimodal characteristic to a pore size determination; and (2) a particular nitrogen absorption/desorption isotherm characteristic that includes a hysteresis at a relative pressure from about 0.8 to about 1.0.

Within the context of the embodiments as disclosed, as well as the claims, the terminology of "foam like or moss like structure and morphology substantially absent inclusion of hollow sphere components, onion like layered sphere components, wormlike components and amorphous metal oxide material components" is intended that such hollow sphere components, onion like layered sphere components, wormlike components and amorphous metal oxide material components comprise no greater than about 20 area percent and more preferably no greater than about 5 area percent of a particular transmission electron microscopy image of a metal oxide foam solid sorbent support or amine functional solid sorbent in accordance with the embodiments, further in accordance with additional description below.

An amine functional solid sorbent in accordance with the embodiments comprises the metal oxide foam solid sorbent support in accordance with the embodiments into which is incorporated an amine material. The amine material may be sorbed (i.e., either absorbed or adsorbed) into the metal oxide foam solid sorbent support physically and/or chemically (i.e., physisorption and/or chemisorption) to provide the amine functional solid sorbent, or alternatively the amine material may be chemically bonded to the metal oxide foam solid sorbent support to provide the amine functional solid sorbent.

A particular sorbent support in accordance with the embodiments includes a metal oxide material having a foam like structure and morphology substantially absent hollow sphere, layered sphere, wormlike and amorphous structure and morphology components.

A particular method for synthesizing a silica solid sorbent support in accordance with the embodiments includes reacting in aqueous solution a soluble silica source material, a surfactant material and a catalyst material while optimizing a concentration of the surfactant material and the catalyst material with respect to the soluble silica source material to provide a silica material having a foam like structure and morphology substantially absent hollow sphere, layered sphere, wormlike and amorphous structure and morphology components.

A particular amine functional solid sorbent in accordance with the embodiments includes a metal oxide material having a foam like structure and morphology substantially absent hollow sphere, layered sphere, wormlike and amorphous structure and morphology components. The particular amine functional solid sorbent in accordance with the embodiments also includes an amine material incorporated into the metal oxide material.

A particular method for preparing a particular amine functional solid sorbent in accordance with the embodiments includes treating a sorbent support comprising a metal oxide material having a foam like structure and morphology substantially absent hollow sphere, layered sphere, wormlike and amorphous structure and morphology components with an amine material to form an amine functional solid sorbent.

A particular method for preparing a particular amine functional solid sorbent in accordance with the embodiments includes modifying a sorbent support with a ring opening polymerization initiator to form a ring opening polymerization initiator modified sorbent support. This particular method also includes reacting the ring opening polymerization initiator modified sorbent support with an oxazoline monomer to provide an amine functional solid sorbent.

BRIEF DESCRIPTION OF THE DRAWINGS

The objects, features and advantages of the embodiments are understood within the context of the Detailed Description of the Embodiments, as set forth below. The Detailed Description of the Embodiments is understood within the context of the accompanying drawings, that form a material part of this disclosure, wherein.

DETAILED DESCRIPTION OF THE EMBODIMENTS

Figure 1:
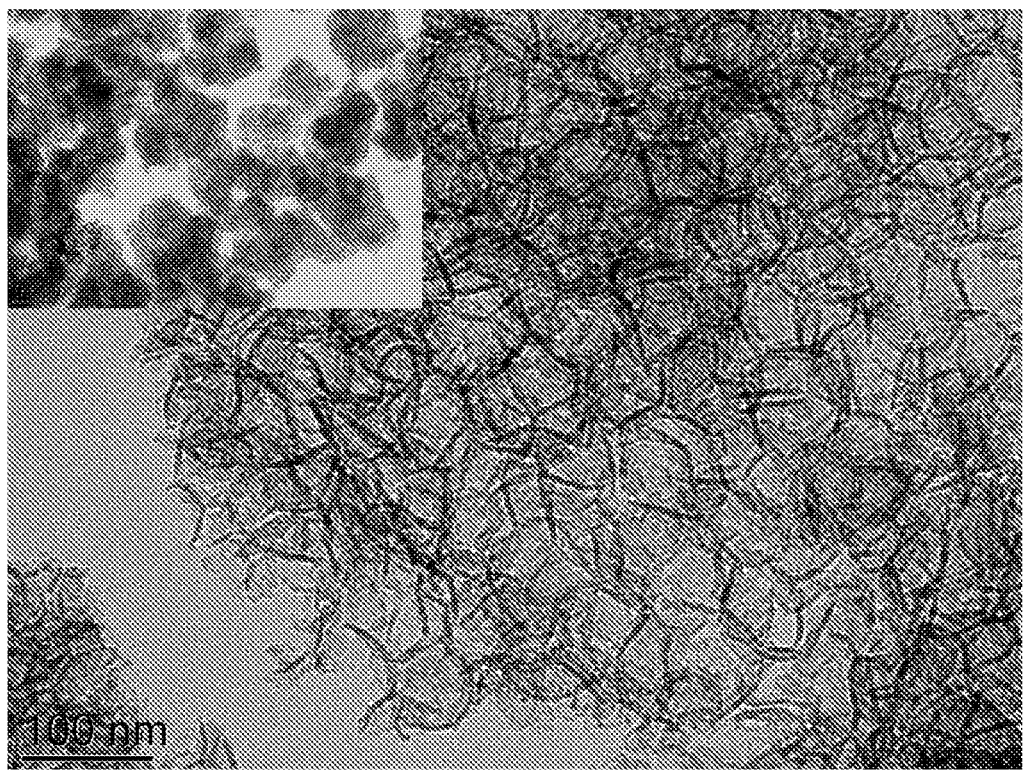
FIG. 1 shows a transmission electron microscopy (TEM) image of an ultra-large pore size silica foam solid sorbent support in accordance with the embodiments.

The embodiments (which are intended as non-limiting embodiments) describe a family of amine functional solid sorbents with high-efficiency for $CO_2$ capture and sequestration based on a cost-effective silica foam (or alternative metal oxide foam) solid sorbent support with ultra-large mesopores. Such silica foam solid sorbent supports have unit cells with a diameter ranging from about 20 to about 200 nm and window openings with a pore size from about 10 to about 40 nm. The embodied silica foam solid sorbent support may be synthesized using an inexpensive silica source, sodium silicate, under nearly neutral conditions. No micellar swelling agents, e.g. 1,3,5-trimethylbenzene (TMB) or post pore-expansion treatments are necessarily required in the synthesis (although they may be used), which may significantly simplify the scale-up synthesis and reduce the cost of the amine functional solid sorbents that are prepared from the silica foam solid sorbent supports.

While the embodiments that follow are directed towards a silica foam solid sorbent support material, the embodiments are not necessarily so limited. Rather, the embodiments also contemplate that other metal oxide foam solid sorbent support materials may also be feasible within the context of the embodiments, by selection of appropriate alternative soluble metal oxide source materials, such as but not limited to metal alkoxides. Viability of such synthetic schemes to metal oxide foam sorbent support materials should be determinable absent undue experimentation. Such other metal oxide foam solid sorbent support materials may include, but are not necessarily limited to, titania, hafnia and zirconia metal oxide foam solid support materials, mixtures thereof, composites thereof and alloys thereof, any of the foregoing of which may include silica materials. Moreover, within the context of the embodiments and the claims, metal oxide foam solid sorbent support materials in general are intended to include non-stoichiometric compositions as well as stoichiometric compositions.

Furthermore, while the embodiments that follow are directed towards amine functional solid sorbents that use silica foam solid sorbent supports within the context of a polyethyleneimine (PEI) amine, the embodiments are similarly also not necessarily so limited. Rather, the embodiments also contemplate amines including but not limited to polyethyleneimine (PEI) and tetraethylenepentamine (TEPA) amines for preparing amine functional solid sorbents in accordance with the embodiments.

Briefly, and for exemplary purposes, 3.0 g of triblock copolymer surfactant Pluronic 123 ($EO_{20}PO_{70}EO_{20}$), was dissolved in a solution of acetic acid (3.0 g), water (52 g), and ammonium fluoride (0.3 g) at 40° C. A solution of sodium silicate (2.35 g) in water (40 g) was heated to 40° C. and poured into the surfactant solution under vigorous stirring. The obtained mixture was kept under static conditions at 40° C. for 24 h and aged at 70° C. for another 24 h. The product was then collected by filtration, followed by copious washings with water. The surfactant template was removed either by ethanol extraction or calcination at 560° C. for 6 h in air to produce the silica foam solid sorbent support. Amine functional solid sorbents with different amine loadings, denoted as F-PEI % x where x represents the weight percentage of the amine in the sorbent, were prepared via wet impregnation using 10 wt % PEI solution in ethanol.

Figure 2:
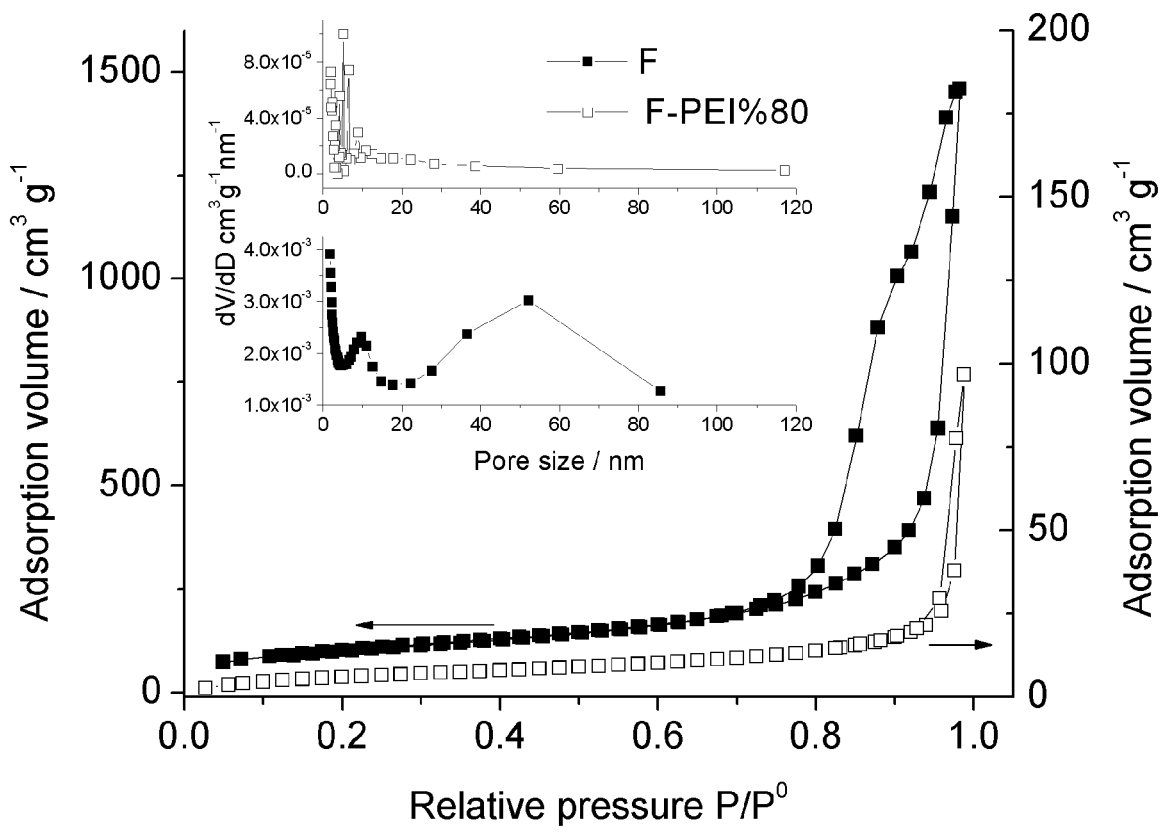
FIG. 2 shows nitrogen adsorption isotherms and pore size distribution graphs for the silica foam solid sorbent support and a related amine functional solid sorbent F-PEI %80 in accordance with the embodiments.
Figure 3:
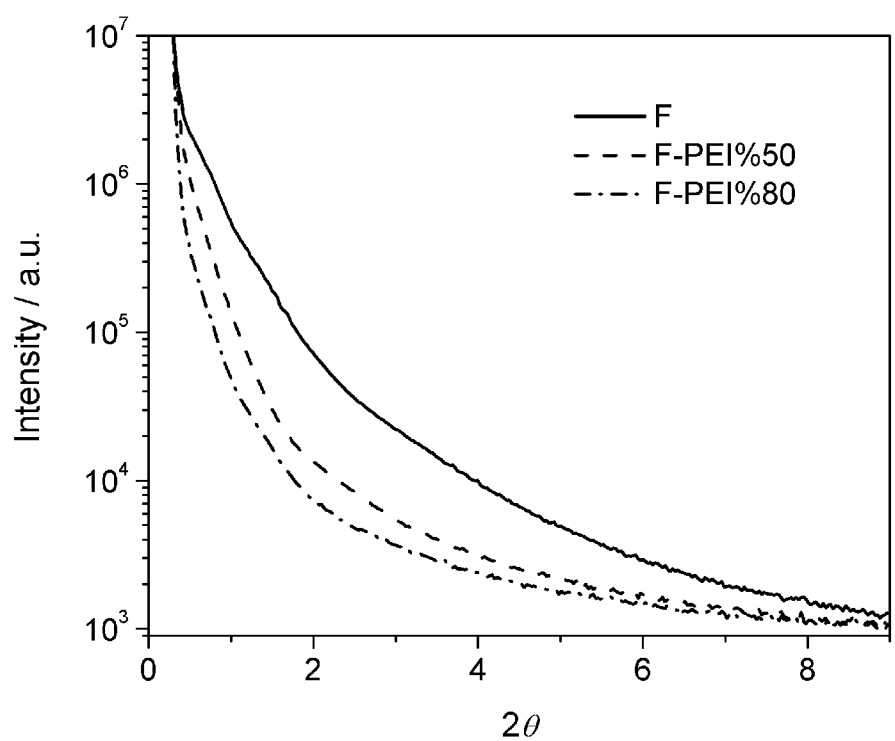
FIG. 3 shows x-ray diffraction patterns for a silica foam solid sorbent support and related amine functional solid sorbents F-PEI %50 and F-PEI %80 in accordance with the embodiments.

The structure and morphology of the silica foam solid sorbent supports were investigated using transmission electron microscopy. As shown in FIG. 1, the units of the silica foam solid sorbent support, similar to those of mesocellular foams, are interconnected cells. However, the size of the cells is much larger (i.e., from about 60 to about 100 nanometers) and the size distribution is relatively broad. A few of the macropores are formed due to the voids of the partially fused foam particles. The textural properties of the silica foam solid sorbent support and the derived amine functional solid sorbent were also analyzed by means of nitrogen physisorption and x-ray diffraction. For the silica foam solid sorbent support, a type IV $N_2$ adsorption isotherm with pronounced capillary condensation starting at $P/P°\sim0.75$ was obtained, as illustrated in FIG. 2. The BET surface area and the total pore volume of the silica foam solid sorbent support are 370 $m^2g^{-1}$ and 2.2 $cm^3g^{-1}$, respectively. The pore size distribution of the silica foam solid sorbent support is bimodal, with a small peak centered at 9.6 and another large broad peak at 52 nm. In contrast, the BET surface area and the pore volume of the PEI impregnated amine functional solid sorbent are much lower, e.g. the BET surface area and the pore volume of F-PEI %80 are 5.2 $m^2g^{-1}$ and 0.001 $cm^3g^{-1}$, respectively, as also illustrated in FIG. 2. The XRD pattern of the silica foam solid sorbent support shows no significant diffraction peak at low angles, as illustrated in FIG. 3, which implies that the cells do not possess any good long-range order, consistent with the morphology seen in the TEM image of FIG. 1. No diffraction peak was found in the XRD pattern of the amine functional solid sorbent either; however, the diffraction intensity is much weaker compared to that of the foam. As the diffraction peak intensity is correlated with the scattering contrast between the silicate walls and the pores, it may be suggested that the drop of the diffraction intensity after PEI loading is the result of the amine filling in the mesopores of the amine functional solid support.

Figure 4:
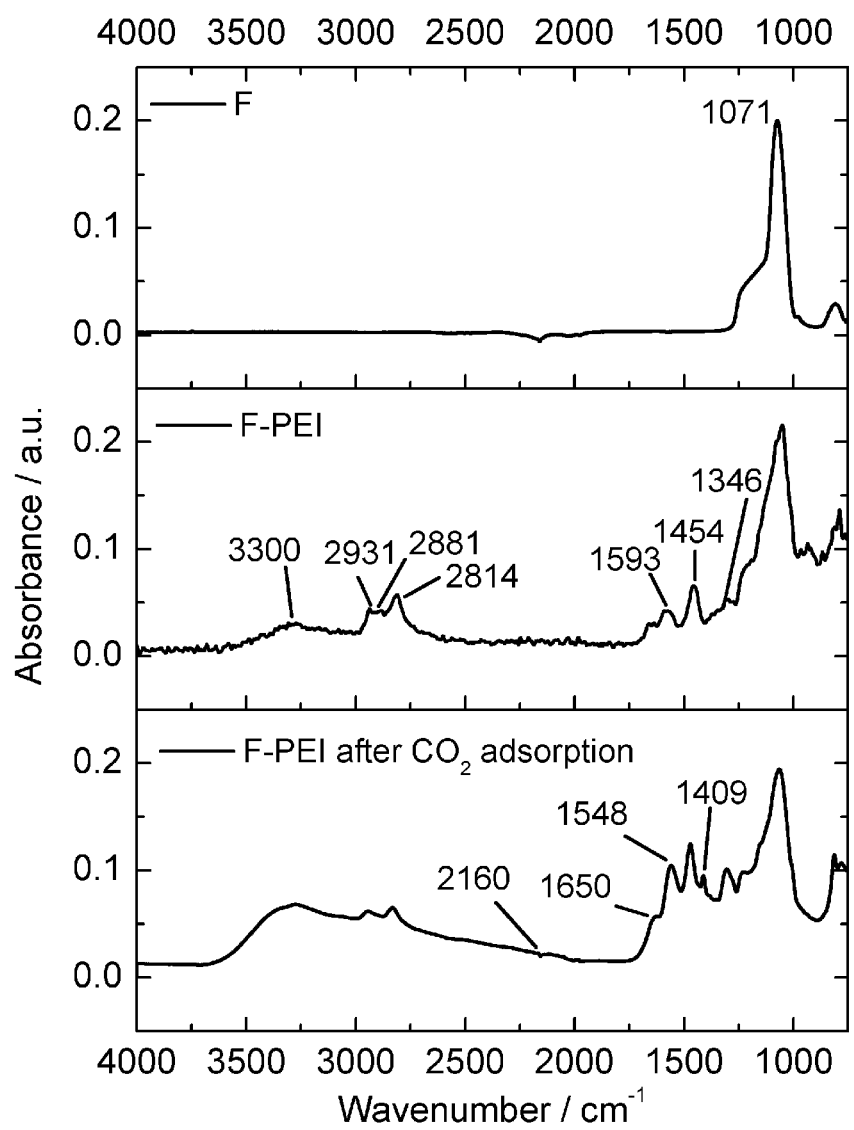
FIG. 4 shows ATR/FTIR spectra of a silica foam solid sorbent support and related amine functional solid sorbent F-PEI %80 before and after $CO_2$ capture and sequestration in accordance with the embodiments.

The PEI-impregnated amine functional solid sorbent was further characterized by attenuated total reflectance/Fourier transform infrared (ATR/FTIR) spectroscopy, as illustrated in FIG. 4. The strong absorption band around 1071 $cm^{-1}$ comes from the Si—O—Si stretching vibrations. Bands at 2931, 2881, 2814, 1454 and 1346 $cm^{-1}$ are due to the $CH_2$ vibrations of PEI while those at 3300 and 1593 $cm^{-1}$ correspond to the N—H symmetric stretching and bending vibrations, respectively. The broad band at 2160 $cm^{-1}$ could be attributed to vibrations of $NH_3^+$ groups. After $CO_2$ adsorption, the sorbent shows new absorption bands at 1650, 1548, and 1409 $cm^{-1}$, which can be assigned to N—H deformation in $RNH_3^+$, C=O stretch, and NCOO skeletal vibrations, respectively, indicative of the formation of carbamates during $CO_2$ adsorption.

Figure 5:
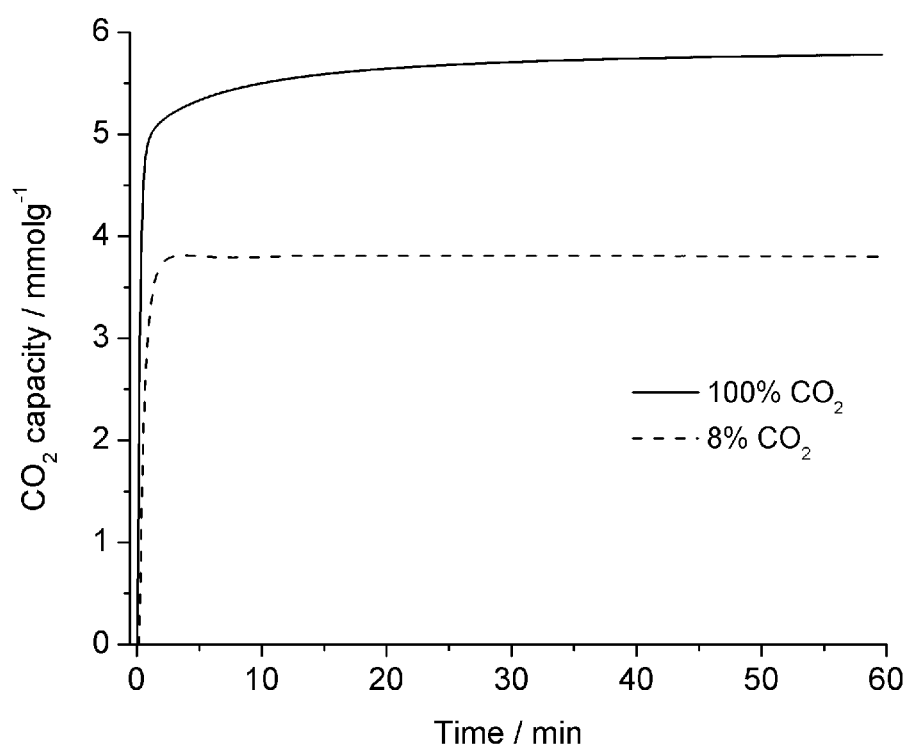
FIG. 5 shows $CO_2$ sorption kinetics for amine functional solid sorbent F-PEI %80 under different $CO_2$ concentration conditions at 75° C. in accordance with the embodiments.

Adsorption kinetics of the amine functional solid sorbent with an 80 wt % PEI loading, F-PEI %80, were gravimetrically evaluated at 75° C. under two different concentrations of $CO_2$. After exposure to 1 atm of pure $CO_2$, a sharp weight gain was observed, as illustrated in FIG. 5. The capacity reached more than 5 $mmolg^{-1}$ within 5 min. Afterwards, the adsorption continued but at a slower rate, which can be attributed to the diffusion resistance of $CO_2$ built up during the adsorption period. A capacity of up to 5.8 $mmolg^{-1}$ was achieved after 60 min, which is among the highest reported for amine functional impregnated solid sorbents under similar conditions. When 8% dry $CO_2$ (balanced with $N_2$) was used, similar two-stage kinetics were observed. The capacity increase in the first adsorption stage was somewhat lower than that measured under pure $CO_2$. The capacity gained in the second stage was essentially zero, which may be due to the lower diffusion driving force from dilute $CO_2$.

Figure 6:
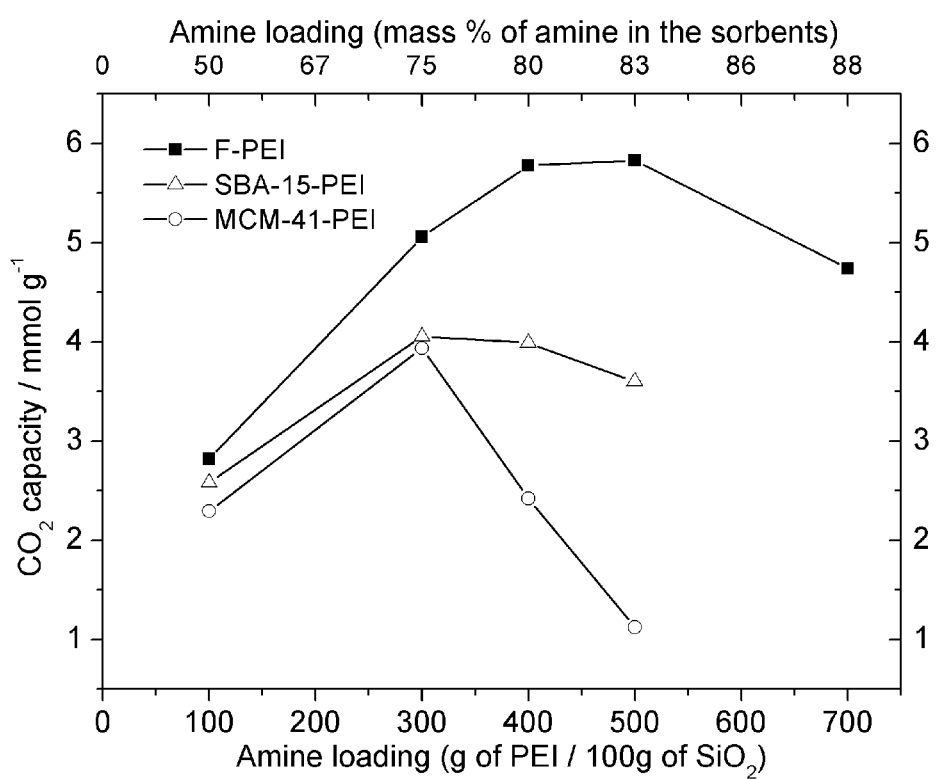
FIG. 6 shows $CO_2$ sorption capacity of various amine functional solid sorbents with different amine loadings in accordance with the embodiments.

The capacities of the amine functional solid sorbents were investigated in terms of amine loading and compared with similar amine functional solid sorbents prepared from conventional mesoporous materials, as illustrated in FIG. 6. $CO_2$ capacities of these amine functional solid sorbents with various amine loadings were measured at 75° C. under 1 atm of pure $CO_2$ for 60 min. The silica foam-based solid sorbent supports show an optimal amine loading at ~80-83 wt % with a capacity of ~5.8 mmol $g^{-1}$, much higher than those of amine functional solid sorbent supports based on bulk SBA-15 (SBA-15-PEI) and MCM-41(MCM-41-PEI), suggesting that the foam with ultra-large mesoporous pores is more advantageous over these bulk mesoporous materials. The stoichiometric ratio of $CO_2$ to amine ($CO_2/N$) for F-PEI %80 is 0.31, comparable to those of amine functional solid sorbents based on textural mesoporous silica and mesocellular foams, but higher than those of MCM-41PEI %75 ($CO_2/N$=0.22) and SBA-15PEI %75 ($CO_2/N$=0.23).

Figure 7:
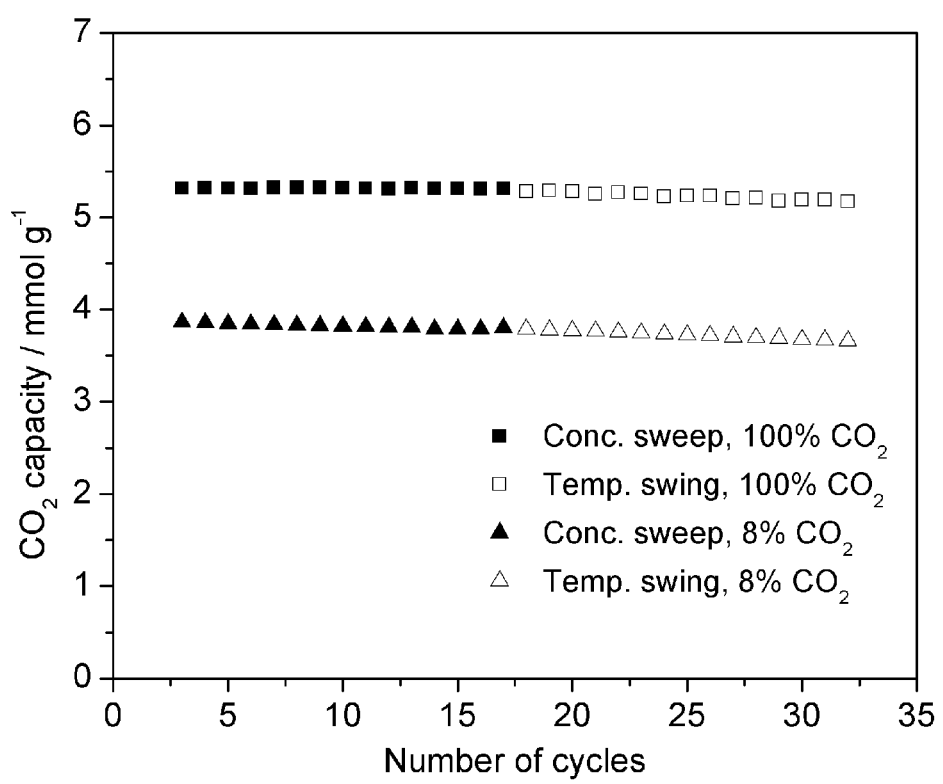
FIG. 7 shows cyclic adsorption/desorption capacity concentration sweep and temperature swing data for an amine functional solid sorbent F-PEI %80 in accordance with the embodiments as a function of number of cycles.

The stability of F-PEI %80 amine functional solid supports was evaluated under pure and 8% dry $CO_2$ using both concentration sweep and temperature swing methods. Because of the rapid adsorption kinetics, the activated amine functional solid sorbent was exposed to $CO_2$ at 75° C. only for 10 min to shorten the cycle time. When concentration sweep was used, the amine functional solid sorbent was regenerated under $N_2$ for 30 min at 75° C. In contrast, the amine functional solid sorbent was regenerated under $N_2$ at 100° C. for 10 min in the temperature swing cycle. As shown in FIG. 7, no significant loss of $CO_2$ capacity was observed after 15 cycles using the concentration sweep process. The combined capacity drop after another 15 cycles using temperature swing was trivial (<5%).

To further investigate the influence of various factors related to synthesis of silica foam solid sorbent supports within the context of $CO_2$ adsorption characteristics of amine functional solid sorbents prepared from the silica foam solid sorbent supports, various experiments were undertaken.

First, the concentration of ammonium fluoride in the silica foam solid sorbent support synthesis solution was controlled at 0.0 gram, 0.1 gram, 0.3 gram and 0.6 gram, to yield silica foam solid sorbent supports whose transmission electron microscopy images are illustrated in FIG. 8A, FIG. 8B, FIG. 8C and FIG. 8D, respectively.

Figure 8:
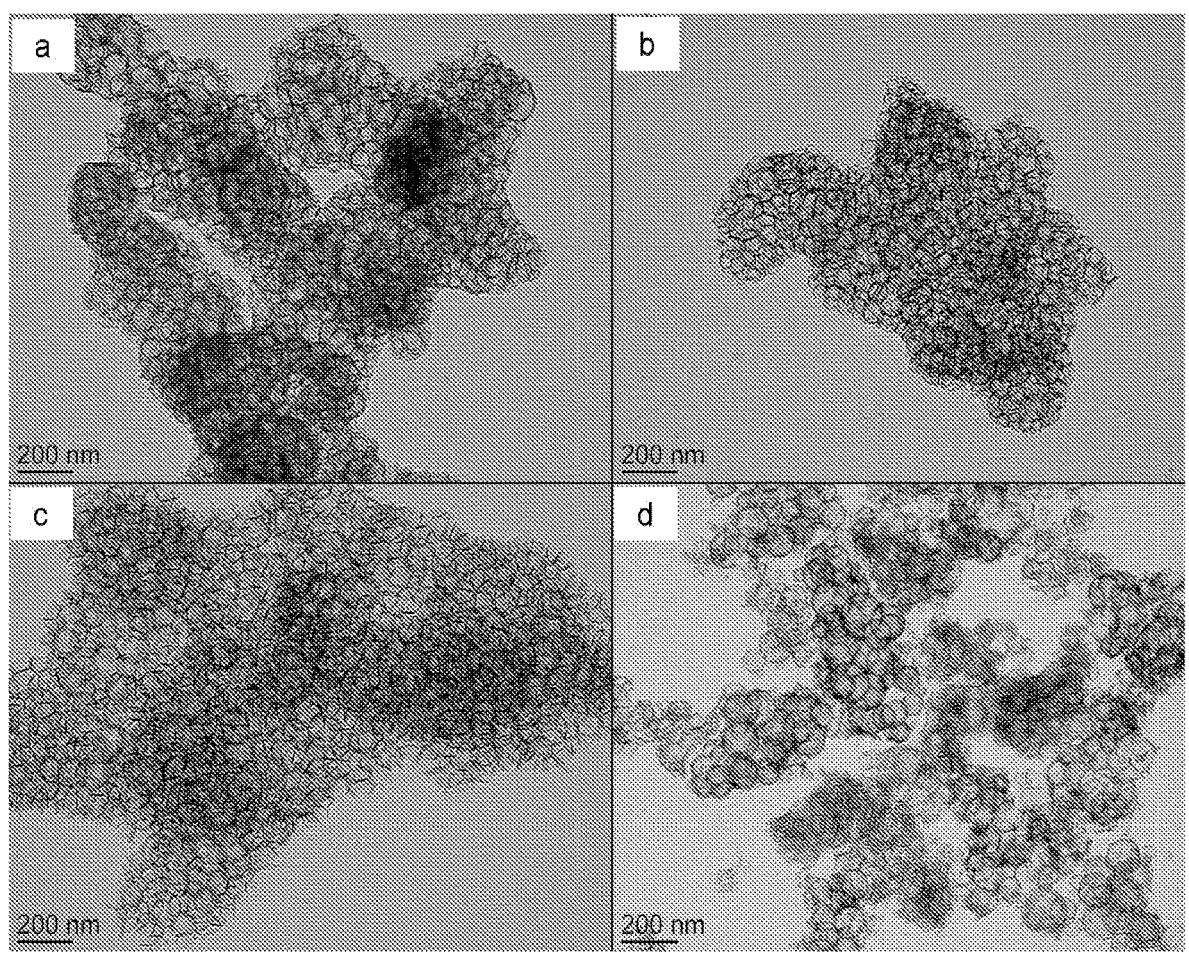
FIG. 8A, FIG. 8B, FIG. 8C and FIG. 8D show transmission electron microscopy images of a silica foam solid sorbent support synthesized with varying amounts of ammonium fluoride catalyst.
FIG. 8E and FIG. 8F show nitrogen adsorption isotherm and pore size distribution graphs for the silica foam solid sorbent supports illustrated in FIG. 8A, FIG. 8B, FIG. 8C and FIG. 8D.
FIG. 8G shows a table correlating the characteristics of silica foam solid sorbent supports within FIG. 8A to FIG. 8F with $CO_2$ sorption capacity of F-PEI %80 amine functional solid sorbents prepared from the silica foam solid sorbent supports.
Figures 8E, 8F, 8G:
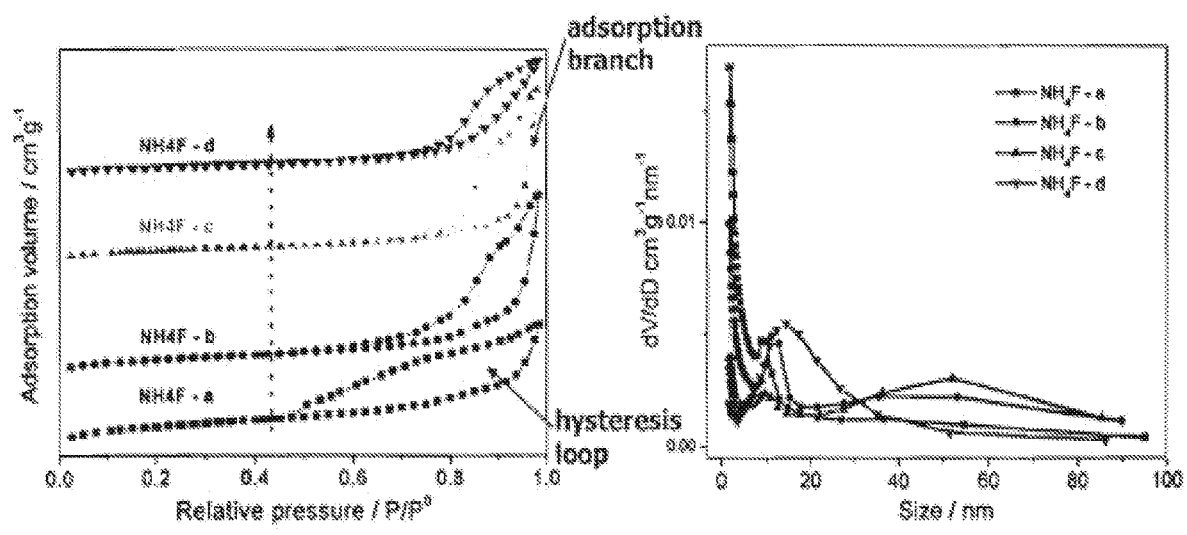

Nitrogen adsorption isotherm data and pore size determination data for the four foregoing silica foam solid sorbent supports are shown in FIG. 8E and FIG. 8F. All of the data from FIG. 8A to FIG. 8F are correlated in the table of FIG. 8G. As is seen in FIG. 8G, the silica foam solid sorbent supports of FIG. 8B and FIG. 8C provided F-PEI %80 amine functional solid sorbents with the highest $CO_2$ capture capacity.

Next, the concentration of water in the silica foam solid sorbent support syntheses solution was controlled at 83 grams, 60 grams, 40 grams and 24 grams to yield silica foam solid sorbent supports whose transmission electron microscopy images are illustrated in FIG. 9A, FIG. 9B, FIG. 9C and FIG. 9D, respectively.

Figure 9:
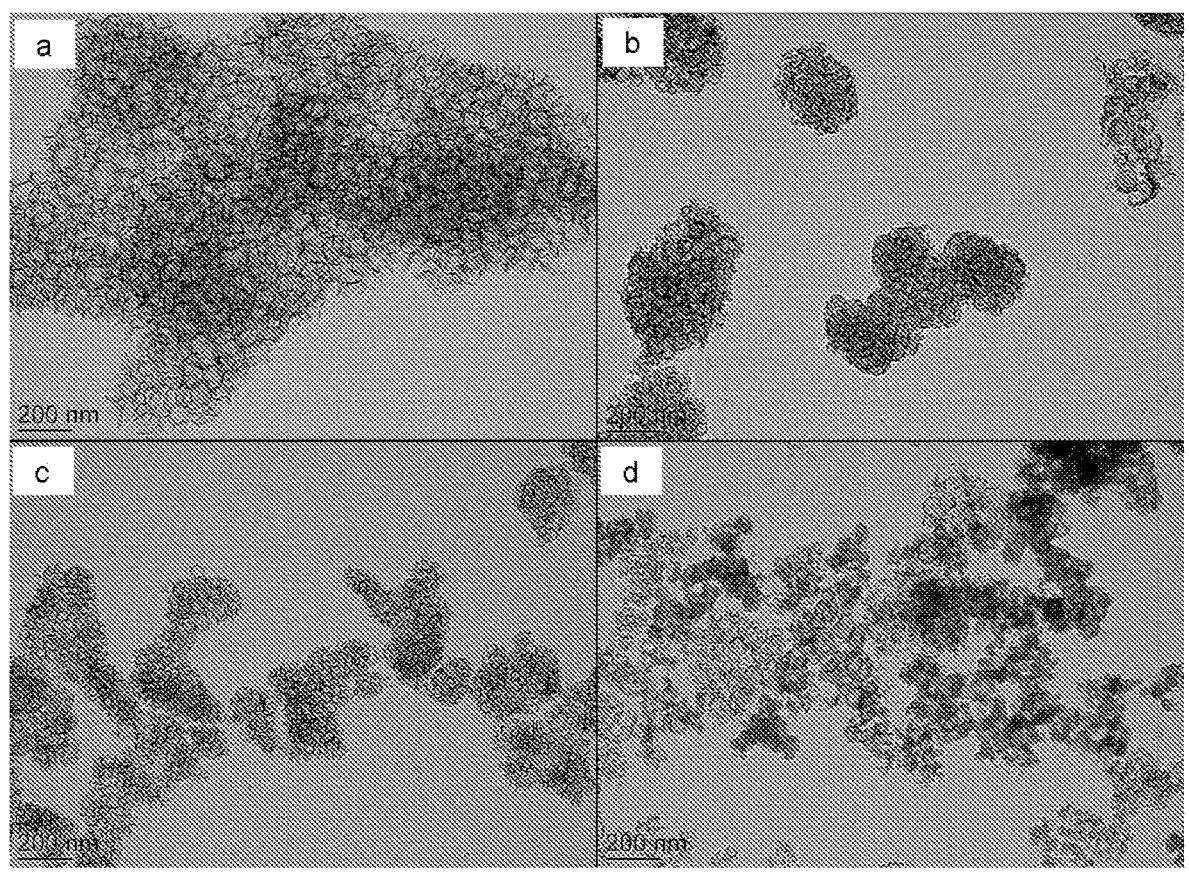
FIG. 9A, FIG. 9B, FIG. 9C and FIG. 9D show transmission electron microscopy images of a silica foam solid sorbent support synthesized with varying amounts of water.
FIG. 9E and FIG. 9F show nitrogen adsorption isotherm and pore size distribution graphs for the silica foam solid sorbent supports illustrated in FIG. 9A, FIG. 9B, FIG. 9C and FIG. 9D.
FIG. 9G shows a table correlating the characteristics of silica foam solid sorbent supports within FIG. 9A to FIG. 9F with $CO_2$ sorption capacity of F-PEI %80 amine functional solid sorbents prepared from the silica foam solid sorbent supports.
Figure 10:
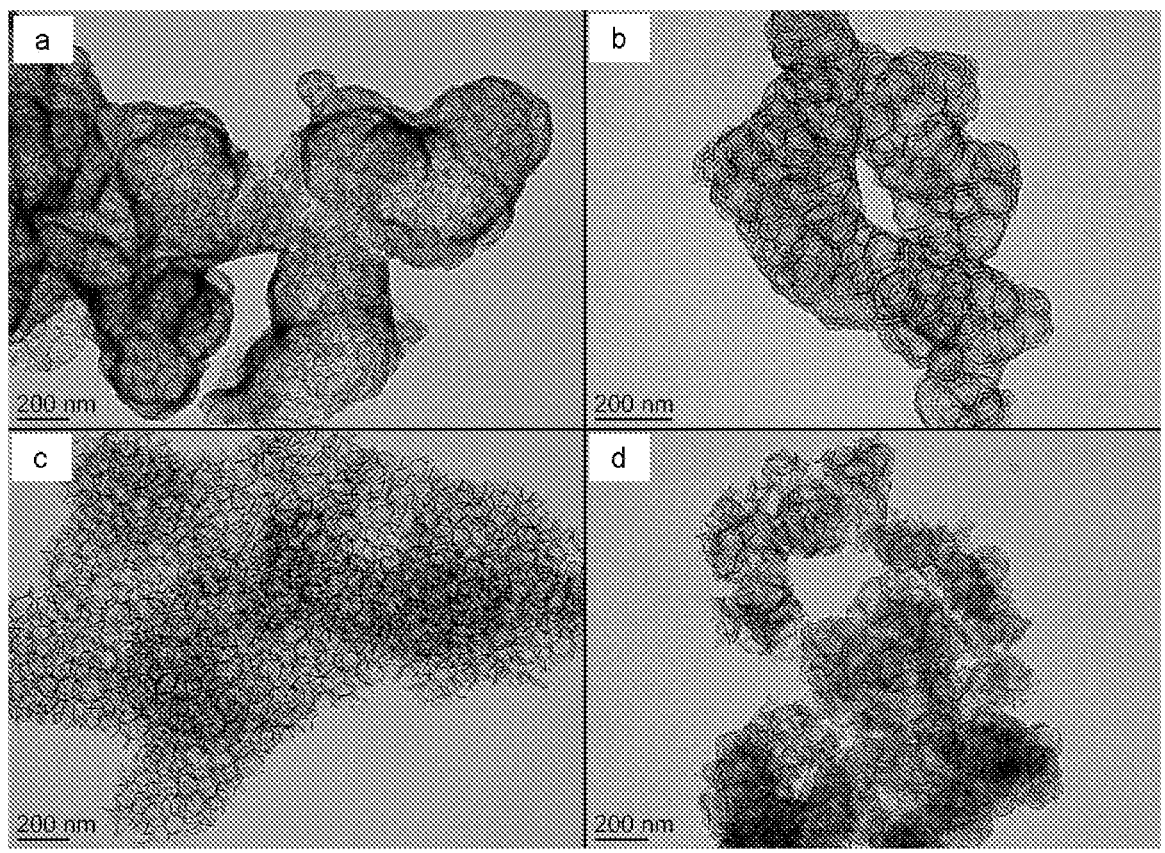
FIG. 10A, FIG. 10B, FIG. 10C and FIG. 10D show transmission electron microscopy images of silica foam solid sorbent supports synthesized with varying amounts of surfactant.
FIG. 10E and FIG. 10F show nitrogen adsorption isotherm and pore size distribution graphs for the silica foam solid sorbent supports illustrated in FIG. 10A, FIG. 10B, FIG. 10C and FIG. 10D.
FIG. 10G shows a table correlating the characteristics of silica foam solid sorbent supports within FIG. 10A to FIG. 10F with $CO_2$ sorption capacity of F-PEI %80 amine functional solid sorbents prepared from the silica foam solid sorbent supports.

Nitrogen adsorption isotherm data and pore size determination data for the foregoing four silica foam solid sorbent supports are shown in FIG. 9E and FIG. 9F. All of the data from FIG. 9A to FIG. 9F are correlated in the table of FIG. 9G. As is seen in FIG. 9G, the silica foam solid sorbent support of FIG. 9A provided the amine functional solid sorbent with the highest $CO_2$ capture capacity.

Next, the concentration of P123 surfactant in the silica foam solid sorbent support synthesis solution was controlled at 0.75 grams, 1.5 grams, 3 grams and 4.5 grams to yield silica foam solid sorbent supports whose transmission electron microscopy images are illustrated in FIG. 10A, FIG. 10, FIG. 10C and FIG. 10D, respectively.

Nitrogen adsorption isotherm data and pore size determination data for the foregoing four silica foam solid sorbent supports are shown in FIG. 10E and FIG. 10F. All of the data from FIG. 10A to FIG. 10F are correlated in the table of FIG. 10G. As is seen in FIG. 10G, the silica foam solid sorbent supports of FIG. 10C provided the amine functional solid sorbent with the highest $CO_2$ capture capacity.

Finally, the temperature of the silica foam solid sorbent support synthesis solution was controlled at 20° C., 40° C., 50° C., 55° C., 60° C. and 80° C. to yield silica foam solid sorbent supports whose transmission electron microscopy images are illustrated in FIG. 11A, FIG. 11B, FIG. 11C, FIG. 11D, FIG. 11E and FIG. 11F.

Figure 11:
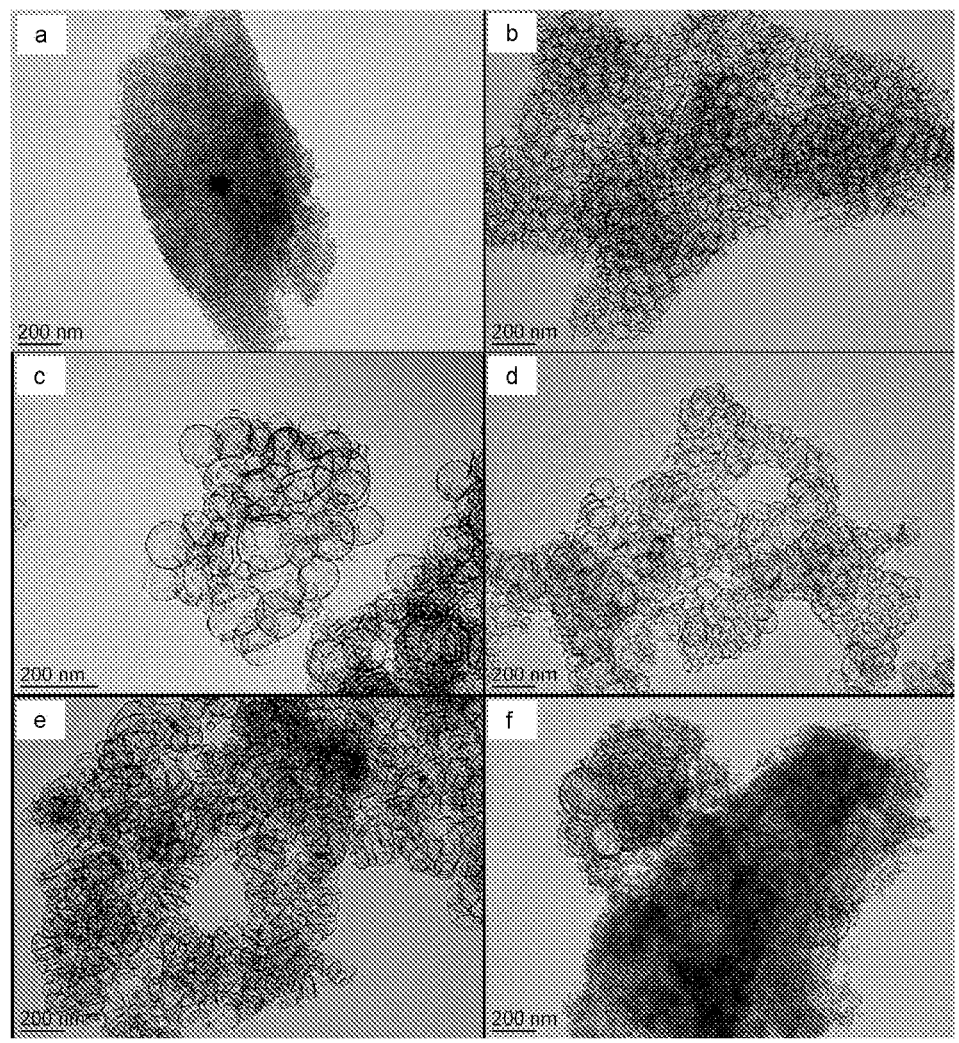
FIG. 11A, FIG. 11B, FIG. 11C, FIG. 11D, FIG. 11E and FIG. 11F show transmission electron microscopy images of silica foam solid sorbent supports synthesized at varying synthesis solution temperatures.
FIG. 11G shows a table correlating the characteristics of silica foam solid sorbent supports of FIG. 11A to FIG. 11F with $CO_2$ sorption capacity of F-PEI %80 amine functional solid sorbents prepared from the silica foam solid sorbent supports.
Figures 11G, 12A:
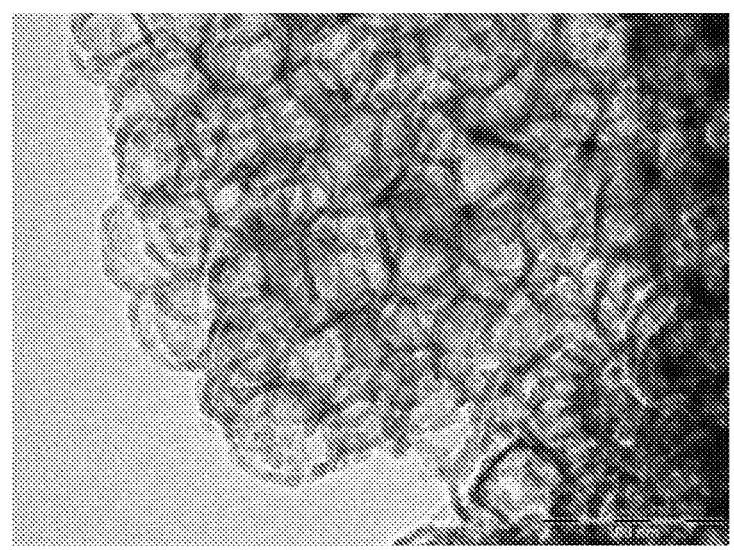
FIG. 12A shows a transmission electron microscopy image of an additional silica foam solid sorbent support synthesized in accordance with the embodiments.

All of the data from FIG. 11A to FIG. 11F are correlated in the table of FIG. 11G. As is seen in FIG. 11G, the silica foam solid sorbent supports of FIG. 11B, FIG. 11D and FIG. 11E provided the amine functional solid sorbent with the highest $CO_2$ capture capacity.

As is seen from the foregoing experimental data, under all circumstances, amine functional solid sorbents that derive from silica foam solid sorbent supports that have a foam structure and morphology substantially absent a hollow sphere, an onion layered sphere, a wormlike or an amorphous material structure and morphology (i.e., as designated in FIG. 8G, FIG. 9G, FIG. 10G and FIG. 11G which thus provide particular transmission electron microscopy images of operative and intended silica foam solid sorbent supports and amine functional solid sorbents in accordance with the embodiments) provide for highest $CO_2$ capture capacity. Moreover, the foregoing data suggest a weight range ratio of sodium silicate:ethylene oxide/propylene oxide surfactant: ammonium fluoride catalyst may be optimized in a range from about 24:25:1 grams to about 8:11:1 grams to provide a silica foam solid sorbent support having a foam structure and morphology substantially absent the hollow sphere, layered sphere, wormlike or amorphous structure and morphology components in accordance with the embodiments.

Beyond the foregoing examples which were undertaken within the context of a PEI amine material impregnated within a silica foam solid sorbent support to provide an amine functional solid sorbent, the embodiments also contemplate an amine functional solid sorbent that includes a covalent bonded amine linkage to a silica foam solid sorbent support from which is comprised the amine functional solid sorbent. The following description, which is directed towards such an amine functional solid sorbent that includes such a covalent bonded amine linkage, may be formed using a method that is additionally applicable to sorbent supports other than silica foam solid sorbent supports with transmission electron microscope characteristics otherwise in accordance with the foregoing embodiments (i.e., where the transmission electron microscope characteristics provide silica foam solid sorbent supports having a foam structure and morphology substantially absent the hollow sphere, layered sphere, wormlike or amorphous structure and morphology).

To that end, and in yet another typical synthesis, 1,3,5-trimethylbenzene (TMB, 22.5 g) was added to a solution of water (175 g), P123 (15 g), acetic acid (22.5 g) and NaF (0.3 g). The emulsion was kept stifling at 40° C. for 2 hr. Sodium silicate (15.5 g) was dissolved in water (200 g) at 40° C. after which the solution was poured into the above emulsion. The resulting milky mixture was kept stirring at 40° C. for 24 hr. The product was filtered and then calcined at 550° C. in air.

A transmission electron microscopy image of such a resulting silica foam solid sorbent support is shown in FIG. 12A. FIG. 12A thus illustrates a silica foam solid sorbent support similar with the silica foam solid sorbent supports described above. Such a silica foam solid sorbent support shows a foam like or moss like structure and morphology absent hollow sphere, onion layered sphere, worm like and amorphous material structures and morphologies.

Figure 12B:
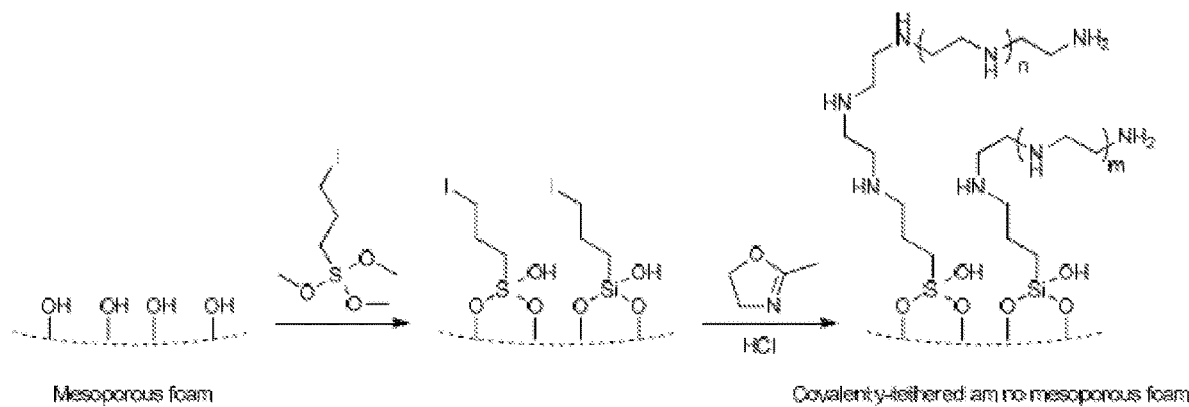
FIG. 12B shows a chemical reaction scheme for covalently bonding and attaching an amine material within the silica foam solid sorbent support of FIG. 12A.

An amine functional solid sorbent was then prepared from the silica foam solid sorbent support whose transmission electron microscopy image is illustrated in FIG. 12A while using the synthesis scheme of FIG. 12B. Within the synthesis scheme of FIG. 12B, an initiator is grafted onto the silica foam solid sorbent support to initiate the ring-opening polymerization of oxazolines, e.g. 2-methyl-2-oxazoline, as s relatively benign and inexpensive monomer in comparison with an aziridine monomer. The derived polymer was then hydrolyzed using concentrated HCl solution at 90° C. to generate polyethyleneimine for $CO_2$ capture and sequestration. The sorbent was neutralized with 2 M NaOH, filtered and washed with DI water until the pH of the filtrate was 7-8.

Figure 12C:
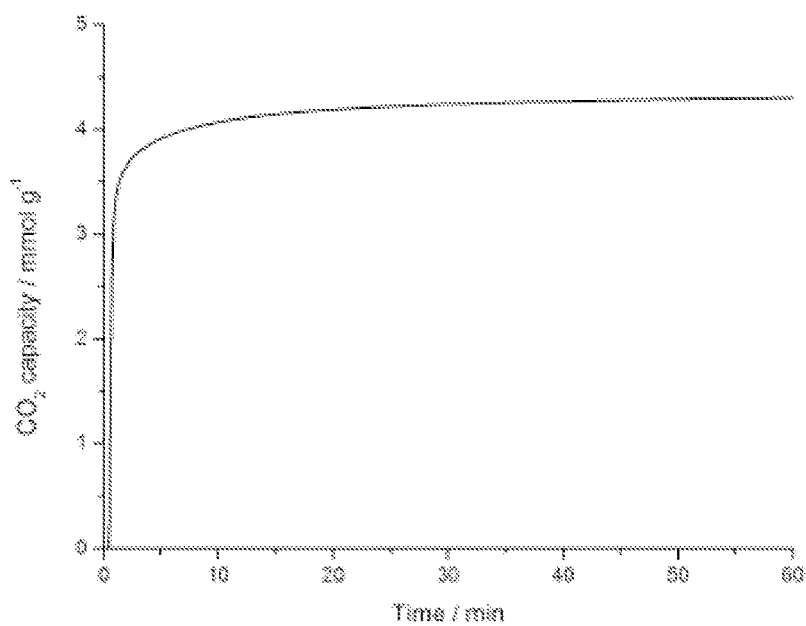
FIG. 12C and FIG. 12D show, respectively, $CO_2$ sorption characteristics of an F-PEI %80 amine functional solid sorbent derived from a covalently bonded polyethyleneimine amine material in accordance with the reaction scheme of FIG. 12B further within the additional silica foam solid sorbent support of FIG. 12A.
Figure 12D:
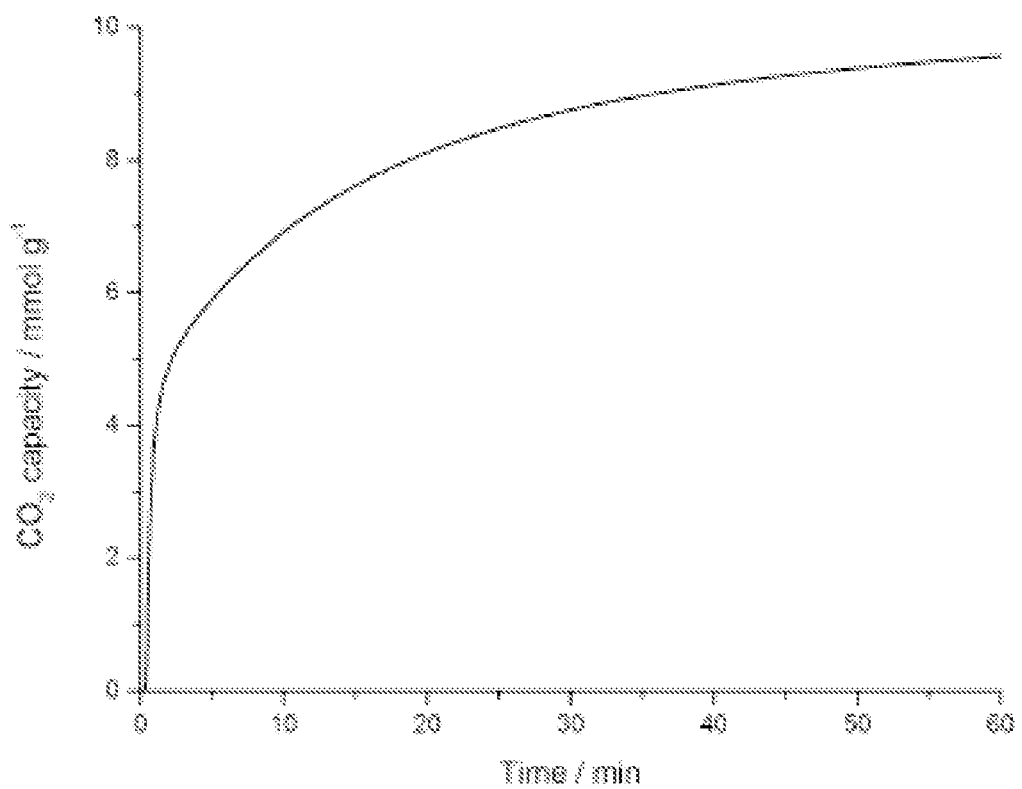

Finally, FIG. 12C and FIG. 12D show $CO_2$ adsorption characteristics of the resulting covalently linked polyethyleneimine amine functional solid sorbent under respectively dry $CO_2$ conditions and wet $CO_2$ conditions.

Thus, as shown experimentally above, the morphology and structure of a silica foam solid sorbent support significantly affects the capture capacity of an amine functional solid sorbent that is prepared from the silica foam solid sorbent support.

In summary, a series of cost-effective silica foam solid sorbent supports with ultra-large mesopores was developed for high-efficiency supported amine sorbents. The sorbents exhibit fast $CO_2$ capture kinetics as well as high adsorption capacity, up to 5.8 mmol $g^{-1}$ under 1 atm of dry $CO_2$. The sorbent also shows good stability over multiple adsorption-desorption cycles.

All references, including publications, patent applications, and patents cited herein are hereby incorporated by reference in their entireties to the extent allowed and as if each reference was individually and specifically indicated to be incorporated by reference and was set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it was individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

Therefore, the embodiments are illustrative of the invention rather than limiting of the invention. Revisions and modifications may be made to methods, materials, structures and dimensions related to a silica foam solid sorbent support, amine functional solid sorbent and related methods in accordance with the embodiments while still providing a metal oxide solid sorbent support, an amine functional solid sorbent and related methods in accordance with the invention, further in accordance with the accompanying claims.

What is claimed is:

1. A stable, high-capacity sorbent support comprising a porous metal oxide material having a foam-like structure and morphology, where the foam-like structure and morphology is substantially absent of hollow sphere, layered sphere, wormlike and amorphous inclusions, and further wherein a pore size distribution of the sorbent support is bimodal, and wherein the pores of the sorbent support comprise mesopores and macropores, and wherein two peaks are observed as a result of an electron microscopy test or a gas adsorption test.

2. The sorbent support of claim 1 wherein the porous metal oxide material comprises a silica material.

3. A stable, high-capacity sorbent support comprising a porous metal oxide material having a foam-like structure and morphology, where the foam-like structure and morphology is substantially absent of hollow sphere, layered sphere, wormlike, and amorphous inclusions, and wherein a pore size distribution of the sorbent support is bimodal, and wherein the pores of the sorbent support comprise mesopores and macropores, wherein two peaks are observed as a result of an electron microscopy test or a gas adsorption test, and further wherein the porous metal oxide material is selected from the group consisting of titania, hafnia, and zirconia materials, mixtures thereof, composites thereof, and alloys thereof.

4. The sorbent support of claim 1 wherein the pore size distribution of the sorbent support has an irregularly spaced and sized unit cell of size from about 20 to about 200 nanometers and a window opening with a pore size from about 10 to about 40 nm.

5. A stable, high-capacity sorbent material comprising:
a porous metal oxide material having a foam-like structure and morphology, where the foam-like structure and morphology is substantially absent of hollow sphere, layered sphere, wormlike and amorphous inclusions, and further wherein a pore size distribution of the sorbent support is bimodal, and wherein the pores of the sorbent support comprise mesopores and macropores, wherein two peaks are observed as a result of an electron microscopy test or a gas adsorption test; and
an amine material incorporated into the porous metal oxide material to provide the sorbent.

6. The sorbent material of claim 5 wherein the porous metal oxide material comprises a silica material.

7. A stable, high-capacity sorbent material comprising:
a porous metal oxide material having a foam like or a moss like structure and morphology, where the foam like or the moss like structure and morphology is substantially absent of hollow sphere, layered sphere, wormlike and amorphous inclusions, and wherein a pore size distribution of the sorbent support is bimodal, and wherein the pores of the sorbent support comprise mesopores and macropores, wherein two peaks are observed as a result of an electron microscopy test or a gas adsorption test, and further wherein the porous metal oxide material is selected from the group consisting of titania, hafnia and zirconia materials, mixtures thereof, composites thereof and alloys thereof; and an amine material incorporated into the porous metal oxide material.

8. The sorbent material of claim 5 wherein the porous metal oxide material has an irregularly spaced and sized unit cell of size from about 20 to about 200 nanometers and a window opening with a pore size from about 10 to about 40 nm.

9. The sorbent material of claim 5 wherein the amine material is sorbed into the porous metal oxide material.

10. The sorbent material of claim 9 wherein the amine material comprises polyethyleneimine.

11. The sorbent material of claim 9 wherein the amine material comprises tetraethylenepentamine.

12. The sorbent material of claim 5 wherein the amine material is chemically bonded to the porous metal oxide material.

13. The sorbent material of claim 12 wherein the amine material is polyethyleneimine.

14. A stable, high-capacity sorbent support comprising a porous metal oxide material having a foam-like structure and morphology, wherein the foam-like structure and morphology is substantially absent of any hollow sphere, layered sphere, wormlike or amorphous inclusions, and further wherein a pore size distribution of the sorbent support is bimodal, and wherein the foam-like structure and morphology comprises a pure $CO_2$ sorption capacity of at least 4.0 mmol g-1, and wherein the foam-like structure and morphology comprises a stable sorption capacity such that the pure $CO_2$ sorption capacity is stable within an approximately 5% drop combined as a whole upon fifteen or more cycles of $CO_2$ desorption and adsorption.

15. The sorbent support of claim 14, wherein the metal oxide material having the foam-like structure and morphology is characterized by a transmission electron microscopy image that illustrates the foam-like structure and morphology.

16. A stable, high-capacity sorbent material consisting essentially of:
a porous metal oxide material having a foam-like structure and morphology, where the foam-like structure and morphology is substantially absent of any hollow sphere, layered sphere, wormlike or amorphous inclusions, and further wherein a pore size distribution of the sorbent support is bimodal, and wherein the pores of the sorbent support comprise mesopores and macropores, further wherein two peaks are observed as a result of an electron microscopy test or a gas adsorption test; and an amine material incorporated into the porous metal oxide material.

17. The sorbent material of claim 16, wherein the metal oxide material is characterized by a transmission electron microscopy image which illustrates the foam-like structure and morphology.

18. The sorbent support of claim 2 wherein:
an x-ray diffraction spectrum of the sorbent support shows a downward curvature from 0 to 8 degrees of 2θ, absent a peak from 0.8 to 8 degrees of 2θ; and
the nitrogen absorption/desorption isotherm of the sorbent support shows a hysteresis at relative pressure of about 0.8 to about 1.0.

19. The sorbent of claim 13 wherein:
an x-ray diffraction spectrum of the sorbent support shows a downward curvature from 0 to 8 degrees of 2θ, absent a peak from 0.8 to 8 degrees of 2θ; and
the nitrogen absorption/desorption isotherm of the sorbent support shows a hysteresis at relative pressure of about 0.8 to about 1.0.

20. The sorbent support of claim 1, wherein the distribution comprises a first small peak centered at around 9.6 nm and a large broad peak centered at around 52 nm.

21. The sorbent material of claim 1, wherein the macropores are formed due to voids of partially fused mesopores.

22. The capacity sorbent support of claim 14, wherein the foam-like structure and morphology comprises a stable sorption capacity such that the pure $CO_2$ sorption capacity is stable within an approximately 10% drop upon fifty or more cycles of $CO_2$ desorption and adsorption.

23. A stable, high-capacity sorbent support comprising a porous metal oxide material having a foam-like structure and morphology, where the foam-like structure and morphology is substantially absent of hollow sphere, layered sphere, wormlike and amorphous inclusions, and further wherein a pore size distribution of the sorbent support is bimodal, and wherein the pores of the sorbent support comprise mesopores and macropores, and wherein the foam-like structure and morphology comprises a stable sorption capacity such that the pure $CO_2$ sorption capacity is stable within an approximately 5% drop combined as a whole upon fifteen or more cycles of $CO_2$ desorption and adsorption.

24. The sorbent material of claim 1, wherein a small peak represents a window opening of internal foam unit cells, and further wherein a large broad peak represents internal foam unit cells.

25. The sorbent material of claim 24, wherein the large broad peak represents internal foam unit cells having a diameter ranging from about 20 nm to about 200 nm.

26. The sorbent material of claim 9, wherein the amine material is a linear amine.

27. The sorbent support of claim 1, wherein a first peak of the two peaks comprises mesopores and a second peak of the two peaks comprises macropores.

28. The sorbent support of claim 1, wherein a size of the mesopores is between about 3 to 20 nanometers and a size of the macropores is between about 50 to 600 nanometers.

29. The sorbent support of claim 1, wherein a size of the mesopores is between about 3 to 5 nanometers and a size of the macropores is between about 50 to 160 nanometers.

30. The sorbent support of claim 1, wherein a size of the mesopores is between about 5 to 20 nanometers and a size of the macropores is between about 200 to 600 nanometers.

31. The sorbent support of claim 1, wherein a size of the mesopores is between about 10 to 40 nanometers and a size of the macropores is between about 50 to 200 nanometers.

32. The sorbent support of claim 1, wherein the foam-like structure and morphology comprises a stable sorption capacity such that the pure $CO_2$ sorption capacity is stable within an approximately 5% drop combined as a whole upon fifteen or more cycles of $CO_2$ desorption and adsorption.

33. The sorbent support of claim 1, wherein the foam-like structure and morphology comprises a stable sorption capacity such that the pure $CO_2$ sorption capacity is stable within an approximately 5% drop combined as a whole upon five or more cycles of $CO_2$ desorption and adsorption.

* * * * *